May 13, 1958 M. M. MARTINEZ 2,834,040
SEA FOOD PROCESSING APPARATUS
Filed Aug. 27, 1956 2 Sheets-Sheet 1
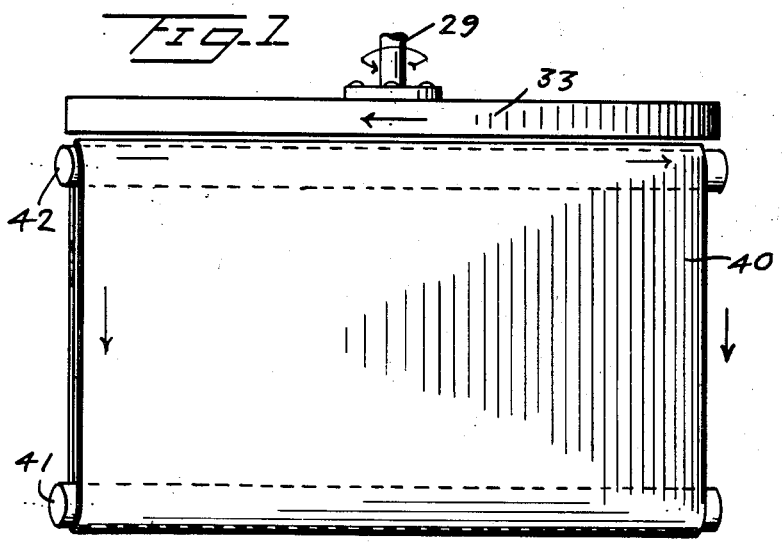
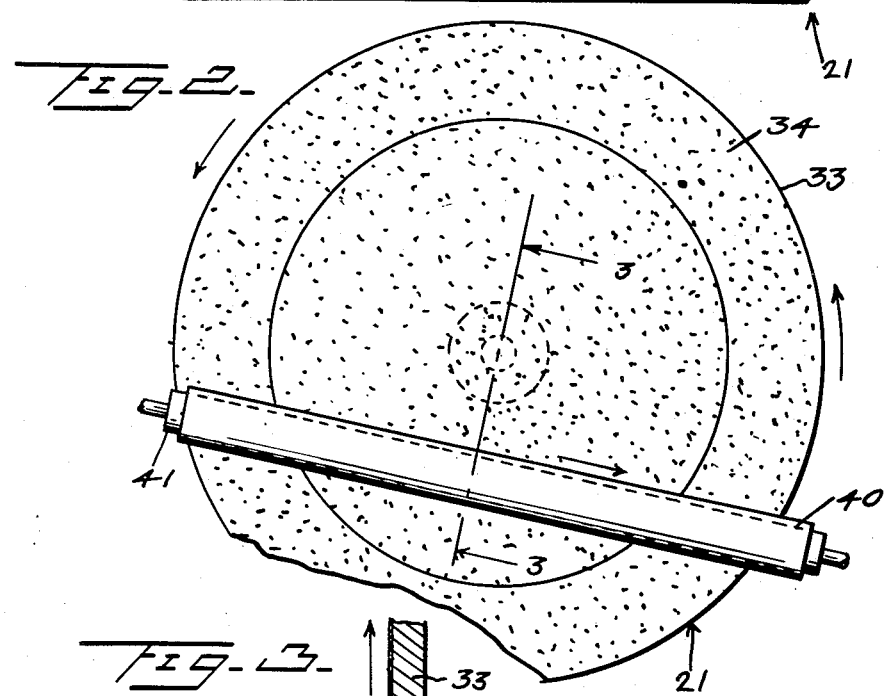
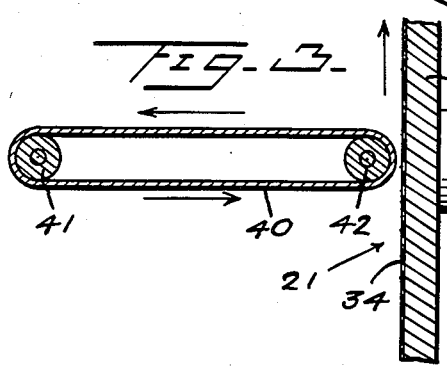
INVENTOR
Melroy M. Martinez
BY Kimmel & Crowell
ATTORNEYS

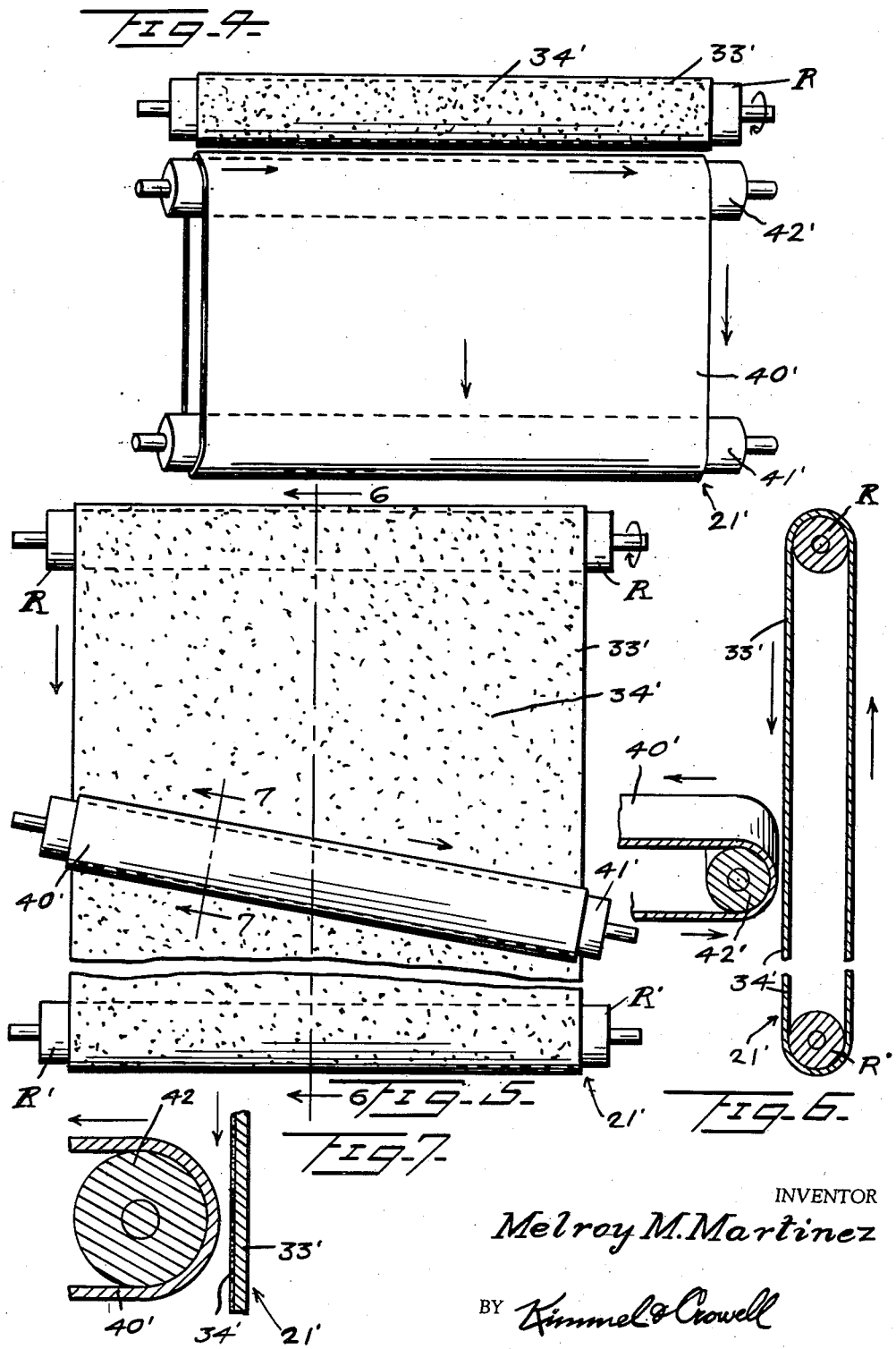

United States Patent Office 2,834,040
Patented May 13, 1958

2,834,040

SEA FOOD PROCESSING APPARATUS

Melroy M. Martinez, New Orleans, La.

Application August 27, 1956, Serial No. 606,300

5 Claims. (Cl. 17—2)

The present invention relates to sea food processing apparatus, and more particularly to sea food processing members adapted for use with the sea food processing apparatus disclosed in my copending application Serial No. 593,960, filed June 26, 1956, entitled Sea Food Processing Apparatus.

The primary object of the invention is to provide sea food processing apparatus having sea food processing members that are quite durable, easily cleaned, extremely effective, and inexpensive to manufacture.

Another object of the invention is to provide sea food processing apparatus including sea food processing members which are extremely effective in their operation and which can be easily changed for repair or cleaning.

A further object of the invention is to provide apparatus for processing sea food which will, in the case of shrimp, remove the legs, shell, head, and clean the shrimp to produce a marketable product.

Other objects and advantages will become apparent in the following specification when considered in the light of the attached drawings, in which:

Figure 1 is a top plan view of the invention.

Figure 2 is a front elevation of the invention.

Figure 3 is a fragmentary transverse cross-section taken along the line 3—3 of Figure 2, looking in the direction of the arrows.

Figure 4 is a top plan view of a modified form of the invention.

Figure 5 is a front elevation of the modification illustrated in Figure 4.

Figure 6 is a fragmentary vertical cross-section taken along the line 6—6 of Figure 5, looking in the direction of the arrows.

Figure 7 is an enlarged fragmentary transverse cross-section taken along the line 7—7 of Figure 5, looking in the direction of the arrows.

Referring now to the drawings in detail wherein like reference characters indicate like parts throughout the several figures, and with particular reference to Figures 1 through 3, the reference numeral 21 indicates generally my new improved sea food processing apparatus constructed in accordance with the invention.

The sea food processing apparatus 21 includes a rotating disc 33 carried by a shaft 29 and having the face of the disc 33 covered with an abradant material as at 34. The shaft 29 is mounted in and driven by any suitable means (not shown).

A flexible endless belt 40 is supported on and trained about a pair of spaced parallel rollers 41 and 42 with the rollers 41 and 42 extending parallel to the face of the disc 33 and sloping to the horizontal from end to end. The belt 40 in passing about the roller 42 comes closely adjacent to but slightly spaced from the face of the disc 33, as seen in Figure 3.

In the use and operation of the invention, as illustrated in Figures 1 through 3, the disc 33 rotates counter clockwise, as viewed in Figure 2, while the upper course of the belt 40 is moving outwardly away from the disc 33, as seen in Figure 3. Obviously, over half of the face of the disc 33, the surface of the disc 33, and the surface of the belt 40 adjacent thereto are moving in opposite directions, while over the other half of the disc 33 these same surfaces are moving in the same direction.

The combined action of the belt 40 and the disc 33 causes the shrimp to lie lengthwise from head to tail touching both the rotating disc 33 and the rotating belt 40.

The downward motion of the rotating disc 33 and the upward motion of the rotating belt 40 creates a rolling, squeezing, grabbing, or shearing action on the hull or shell of the shrimp. The rolling action loosens the meat from the inside of the shell and causes a crushing action on the larger hollow head section. The downward abrasive action of the abrasive surface 34, travelling approximately three times faster than the upward rolling motion of the belt 40, shears off the legs of the shrimp and grabs the shell tearing it open and away from the meat.

Referring now specifically to Figures 4 through 7, a modified sea food processing apparatus is generally indicated at 21'. The sea food processing apparatus 21' has an endless belt 33' supported by and trained over parallel vertically spaced rollers R and R' which are supported and driven by suitable means (not shown).

The belt 33' is provided with an abraded surface 34' on the outer face thereof, as shown in Figure 7. An endless belt 40' is trained over and supported by a pair of rollers 41' and 42' arranged in spaced parallel relation and extending from end to end at an angle to the horizontal. The rollers 41' and 42' are adapted to be supported by and rotated by suitable means (not shown). The rollers 41' and 42' extend parallel to the face of the belt 33' with the roller 42' in spaced relation to the belt 33' so that the belt 40', as it passes between the roller 42' and the belt 33', will be adjacent to but slightly spaced therefrom.

The use and operation of the modification illustrated in Figures 4 through 7 is virtually identical to that of the modification illustrated in Figures 1 through 3 with the exception that the portion of the belt 33' adjacent the roller 42' moves constantly downwardly throughout its width, while the belt 40' has the upper course thereof moving away from the belt 33' constantly.

Obviously, both the apparatus 21 and the apparatus 21' may be substituted for the disc 33 and the roller 40 in my aforementioned copending application.

Having thus described the preferred embodiments of the invention, it should be understood that numerous other modifications and adaptations may be resorted to without departing from the scope of the appended claims.

What is claimed is:

1. Sea food processing apparatus comprising means having an abradant surface arranged for movement in a vertical plane, an endless belt having upper and lower courses arranged perpendicularly to said abradant surface of said means with said upper course moving outwardly therefrom, said endless belt being arranged at an angle to the horizontal.

2. A device as claimed in claim 1 wherein said means having an abradant surface is a rotating disc positioned closely adjacent to but spaced from said belt.

3. A device as claimed in claim 1 wherein said means having an abradant surface is an endless belt arranged closely adjacent to but spaced from said perpendicularly extending belt.

4. A device as claimed in claim 2 wherein said perpendicular belt is mounted on and trained over spaced parallel rollers.

5. A device as claimed in claim 3 wherein said perpendicular belt is supported on and trained over spaced parallel rollers.

References Cited in the file of this patent

FOREIGN PATENTS 631,364     Germany _____ June 18, 1936